May 5, 1959

R. V. MOORE ET AL 2,885,335

NUCLEAR REACTOR FUEL ELEMENT

Filed May 11, 1955

Inventor
RICHARD VALENTINE MOORE ET AL
By
Larson and Whiting
Attorney

United States Patent Office 2,885,335
Patented May 5, 1959

2,885,335

NUCLEAR REACTOR FUEL ELEMENT

Richard Valentine Moore, Appleton, and Gordon Packman, Risley, England, assignors, by mesne assignments, to the United States of America as represented by the United States Atomic Energy Commission Application May 11, 1955, Serial No. 507,524

4 Claims. (Cl. 204—193.2)

This invention relates to nuclear reactors and it is concerned with fuel elements for nuclear reactors.

The principal nuclear reactors constructed to date can be described as having a horizontal orientation; that is, the fuel elements are arranged in a lattice of horizontal channels through which a coolant is passed. One advantage of horizontal orientation is that stresses set up in fuel element canning material due to the weight of fissile fuel inside of the elements are kept to a minimum. A vertical orientation of a reactor has certain attractive advantages but these advantages have to be balanced against the fact that with vertical orientation the stresses set up in the fuel element canning material, especially in the lowest element, may become large (e.g. 200 p.s.i.). With a limited choice of canning materials (for thermal neutron reactors using natural uranium the canning materials appear to be limited to aluminum and magnesium or certain alloys thereof) the operating temperature of the reactor is limited by the creep strength that can be best obtained from those materials. For a reactor designed to produce electrical power by supplying heat to a boiler for a turbo-electric generating plant the higher the temperature at which the reactor operates the greater can be the overall efficiency of the electricity generation, and hence any steps which can be taken to minimize creep problems help to achieve higher overall efficiency.

In a reactor designed to have a vertical orientation it is possible to support each fuel element individually so that the maximum stress in any fuel element is that due only to the weight of one fuel element. Such an arrangement introduces structural material to support the elements in the reactor core and the choices for such material at the present time appears to be limited to steel or beryllium. To compensate for the neutron absorption of steel the expense has to be incurred of enriching the uranium fuel and the alternative of providing beryllium supports is in itself very expensive.

The present invention is based on the novel idea that means for controlling heat transfer may be introduced into a reactor to achieve preferential cooling of those parts of the fuel element canning material which are subject to stress due to a vertical orientation of the reactor. The preferential cooling of the stressed parts of the fuel element canning material allows the fuel elements to be operated at a higher temperature than hitherto thought practicable. This results in a gain in output temperature of the reactor coolant and hence, when used for electricity generation, allows a higher overall efficiency of electricity generation.

According to the invention a nuclear reactor fuel element of the kind comprising a fissile fuel member sheathed in a protective can and suitable for stacking vertically with other similar fuel elements to form a column of elements, has means for controlling heat transfer from the element arranged so that under operating conditions the temperature of those parts of the protective can stressed by the weight of the fuel member is less than those parts not so stressed.

The temperature of the stressed parts may be controlled by poor heat conductors between the fuel member and the stressed parts of the can combined with suitably located heat transfer surfaces arranged to extend from or near the stressed parts so as to reach into a coolant stream passing over the fuel element.

Fuel elements embodying the invention are now described with reference to the accompanying drawings wherein.

Figure 1:
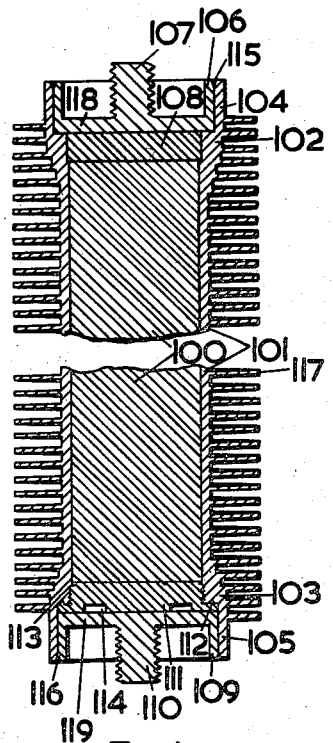
Fig. 1 is a sectional elevation.

In Fig. 1 a circular section rod 100 of natural uranium, which is 1.15" diameter and 3' 4" long, is sheathed in a magnesium can 101. The can 101 has a length of 3' 5¼", the excess length over the rod 100 being made up of finned parts 102 and 103 and sealing flanges 104 and 105. At the top end of the fuel element there is an end cap 106 with a screwed plug 107 and a magnesium oxide disc 108 which is ¼" thick. At the bottom end of the fuel element there is an end cap 109 with a screwed plug 110 and a magnesium oxide disc 111 which is also ¼" thick. The disc 108 is plain and the disc 111 has a knife-edged flange 112, a thread 113 and spanner sockets 114. Argon arc welds 115 and 116 are provided. The caps 109 and 106 are made of the same material as the can 101. The can 101 is machined out of solid bar to provide helical fins 117 having a diameter of 2⅛", a pitch of ⅛" and a thickness of ½₂".

In the assembly of the fuel element the rod 100 is inserted in the can 101, the heat insulating disc 108 is inserted followed by the end cap 106 and the weld 115 is made. The disc 111 is then screwed in, the cap 109 is inserted and the weld 116 is made.

To form a column of these fuel elements, locating and support members are screwed into position on the plugs 107 and 110 so that the stress due to the weight of uranium rod 100 is taken through the plugs 107, 110 and the webs 118, 119 of the end caps. The discs 108, 111 reduce heat transfer from the rod 100 to the plugs and webs, whilst the finned parts 102, 103 ensure a heat dissipation from the protective can in the regions around the discs so that under operating conditions the temperature of the plugs and webs is kept substantially lower than those parts of the can in contact with the fuel element.

Figure 2:
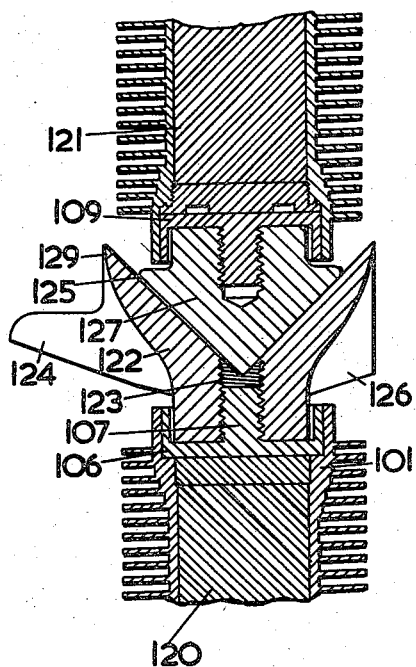
Fig. 2 is a sectional elevation showing a locating and support member between two elements of the kind shown in Fig. 1.
Figure 3:
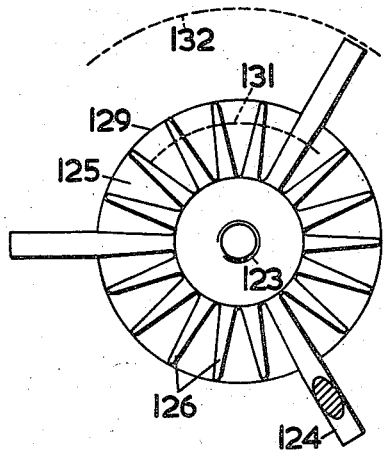
Fig. 3 is an underside view of the locating and support member of Fig. 2.

In Figs. 2 and 3 a lower fuel element 120 supports an upper element 121 through a locating and support spider 122. The spider is made from the same material as that used for the cans 101 and it is carried by the top cap 106 of the element 120. It is secured by a thread 123 engaging the screwed plug 107 of the element 120. The spider 122 has three elliptical-section legs 124 of a size to reach within ½₂" of the walls of a coolant channel in which the elements are located. The spider is provided with a conical cup-shaped part 125 and the underside of this part is provided with fins 126. The upper element 121 is fitted with a conical boss 127 which locates in the cup-shaped part 125 of the spider 122.

The cup-shaped part 125 has a diameter relative to the diameter of the coolant channel in the reactor it is to occupy and to the diameter of boss 127 of the adjacent element 121 such that however the element 121 is lowered on to element 120 the conical boss 127 engages in the cup and is then guided to its correct axial position. The diameter is also such that the rim 129 of the part 125 extends into the coolant stream passing over the elements so that the fins 126 are effective in carrying heat away from the fuel element caps 106, 109 via the boss 127 and the body of the spider 122.

In Fig. 3 the circumference of the fins 126 of the fuel element is indicated by the dotted line 131 and the circumference of the wall of the coolant channel is indicated by the dotted line 132.

Figure 4:
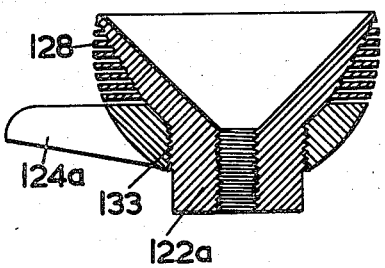
Figs. 4 and 5 are sectional elevations of other forms of locating and support member.

Fig. 4 shows an alternative form of spider 122a. The main modification over the spider 122 of Fig. 3 is that circumferential finning 128 replaces the radial underside finning 126. The legs 124a are screw mounted on a thread 133.

Figure 5:
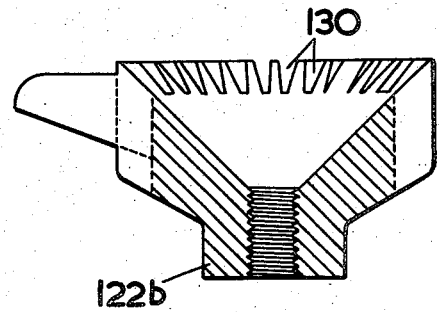

Fig. 5 shows yet another form of spider 122b. In this spider the main modification is that of radial cuts 130 in the cup shaped part 125b whereby the effect of finning is obtained.

The spiders 122, 122a or 122b each perform multiple functions consisting of locating the top centre of the element 120 by reason of the legs 124 reaching to the walls of the coolant channel, of locating the bottom centre of the element 121 by reason of the conical mating surfaces between part 125 and boss 127, of providing a guide to centre the element 121 when lowered on to element 120 whilst preventing the element 121 feeding down the side of element 120, of providing an extended heat transfer surface to assist in keeping the stressed parts cool and lastly the function of providing members (legs 124) that can be coupled to a withdrawing chuck to remove the elements from the reactor.

Figure 6:
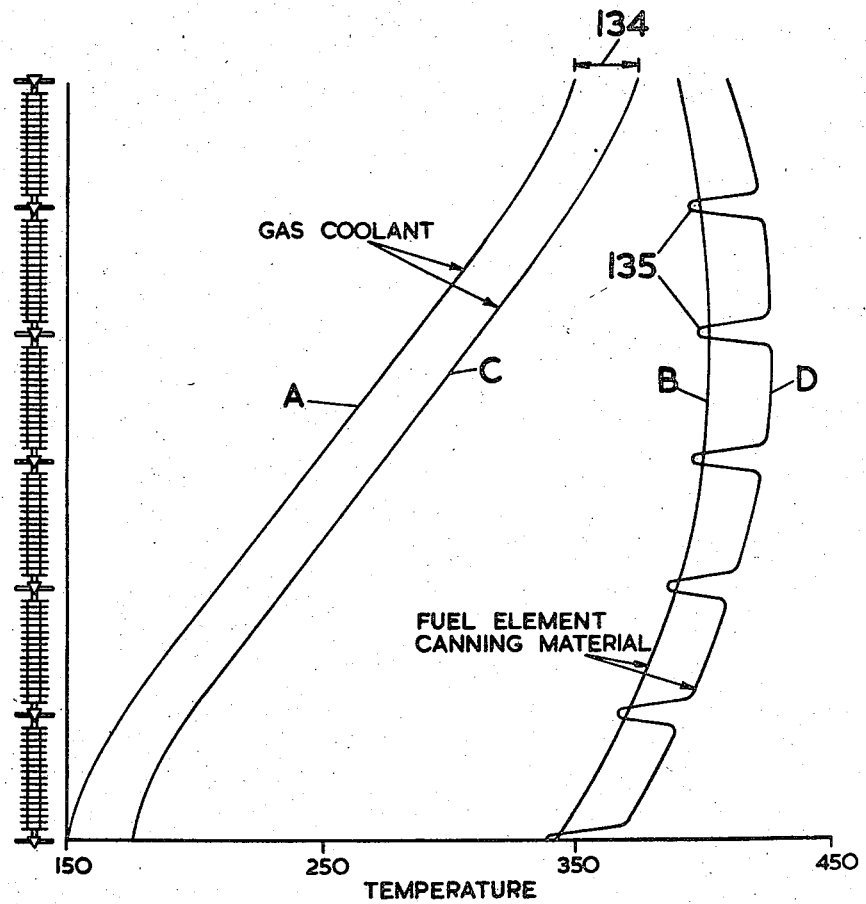
Fig. 6 is a graph.

The graphs of Fig. 6 illustrate the gain expected to be achieved by using the arrangement shown in Fig. 2. The ordinate of the graph is "Distance along the centre coolant channel of a graphite moderated vertically orientated nuclear reactor core with coolant gas passing upwards." This ordinate has been represented symbolically by a column of six fuel elements. Curve A shows the gas coolant temperature and curve B shows the fuel element canning material temperature for a conventional design. Curve C and curve D show the gas coolant temperature and the fuel element canning material temperature respectively for a design embodying the features of the present invention. The outlet temperature gain is represented by the arrow 134. The points 135 on the curve D represent those parts in the fuel element column where canning material is subject to stress due to the weight of the fissile fuel. It is seen that the temperature of these points is reduced to be equal to that existing in the conventional design represented by curve B.

In an alternative form of the invention the discs 108, 111, the spider 122 and conical boss 127 are made from a creep resisting alloy. An alloy of magnesium with 0.65% by weight of manganese is suitable. The selection of the alloying material is governed by the following two considerations. First, although it is present in only small quantities its neutron capture should not be large, and second, it should be compatible with fuel and can material and should not give rise to chemical problems when ultimately introduced into an irradiated fuel element processing plant. The discs 108, 111 when made of alloyed material should have a thickness which is greater than that of the stressed part of the protective can, namely parts 106, 109. (It is not practicable to make the parts 106, 109 of creep resisting alloy as a welding and corrosion problem between dissimilar materials at the can ends.) A reasonable criterion for assessing the properties of the disc material is that it should have a compressive creep strength which is at least double that of the material used for the fabrication of the protective can and that it should have a thickness which is at least double that if the stressed part of the protective can.

In yet another form of the invention the discs 108, 111 are made as a stack of thin magnesium oxide discs, for example, a stack of four discs each one sixteenth of an inch thick, thereby introducing a series of heat transfer surfaces to be traversed in the direction of temperature gradient between the fuel member and the stressed parts 106, 109.

We claim:
1. A nuclear reactor fuel element of the kind comprising a fissile fuel member sheathed in a protective can having at one end of the element a locating cup-shaped member of conical inner surface and at the other end of the element a conical member to locate with a locating cup-shaped member on an adjacent element characterised in that the cup-shaped member has extended heat transfer surfaces on its outer surface extending beyond the diametral dimensions of the fuel element.

2. A nuclear reactor fuel element as claimed in claim 1 wherein said extended heat transfer surfaces are in the from of radial fins.

3. A nuclear reactor fuel element as claimed in claim 1 wherein said extended heat transfer surfaces are in the form of circumferential fins.

4. A nuclear reactor fuel element as claimed in claim 1 wherein said extended heat transfer surfaces are provided by slots cut in the periphery of the cup-shaped member.

References Cited in the file of this patent
UNITED STATES PATENTS

| | | |
|---|---|---|
| 1,893,483 | Belt | Jan. 10, 1933 |
| 2,244,800 | Pascale | June 10, 1941 |
| 2,264,914 | L'Orange | Dec. 2, 1941 |
| 2,708,656 | Fermi et al. | May 17, 1955 |
| 2,770,591 | Wigner et al. | Nov. 13, 1956 |
| 2,790,760 | Powell | Apr. 30, 1957 |

FOREIGN PATENTS

| | | |
|---|---|---|
| 159,720 | Australia | Nov. 10, 1954 |

OTHER REFERENCES

Applied Atomic Power, E. S. C. Smith et al., published by Prentice-Hall, New York, 1946, pp. 126, 127.

The Science and Engineering of Nuclear Power, vol. II, Clark Goodman. Addison-Wesley Press, Cambridge, Mass., October 1948, pp. 129, 130.